United States Patent [19]

Gneiss

[11] Patent Number: 4,593,172

[45] Date of Patent: Jun. 3, 1986

[54] METHOD FOR BONDING ELECTRICALLY CONDUCTIVE WIRES

[75] Inventor: Heinz Gneiss, Ludwigsburg, Fed. Rep. of Germany

[73] Assignee: Robert Bosch GmbH, Stuttgart, Fed. Rep. of Germany

[21] Appl. No.: 543,658

[22] Filed: Oct. 19, 1983

[30] Foreign Application Priority Data

Jan. 8, 1983 [DE] Fed. Rep. of Germany ....... 3300512

[51] Int. Cl.$^4$ ................................................ B23K 1/00
[52] U.S. Cl. .............................. 219/85 M; 219/85 D; 219/85 F
[58] Field of Search .................. 219/85 R, 85 D, 85 F, 219/85 M, 56, 56.21; 228/254

[56] References Cited

U.S. PATENT DOCUMENTS

| 4,089,453 | 5/1978 | Jenkins | 228/254 |
| 4,252,016 | 2/1981 | Saver et al. | 73/204 |
| 4,486,643 | 12/1984 | Gneiss et al. | 219/85 D X |

OTHER PUBLICATIONS

Cary, Howard B., *Modern Welding Technology*, 1979, p. 227.

Primary Examiner—Clarence L. Albritton
Assistant Examiner—Catherine M. Sigda
Attorney, Agent, or Firm—Edwin E. Greigg

[57] ABSTRACT

A method which serves to bond electrically conductive wires by means of heating and of a soldering material; it is applicable in particular to wire segments of a hot wire fastened on wire holders for measuring the mass of a flowing medium, where the wire segments intersect one another and form a loop. In the method, in a first operation, the wire to be bonded is guided around the respective wire holder such that it forms a loop, and a soldering segment provided with a layer of soldering material comes to rest in the vicinity of the intersection point of the wire segments, in fact only at one of the wire segments. In a second operation, an electrode located at the poles of an electrical current circuit is made to contact the wire segment not provided with soldering material at the intersection point, and in a third operation, the electrical current circuit is closed by the switch for the purpose of resistance heating of the electrode, until the melting temperature of the soldering material is attained and the intersecting wire segments are soldered together at the intersection point.

2 Claims, 2 Drawing Figures

METHOD FOR BONDING ELECTRICALLY CONDUCTIVE WIRES

BACKGROUND OF THE INVENTION

The invention is based on a method for bonding electrically conductive wires.

A method for bonding electrically conductive wires has already been proposed in which the segments of a hot wire which intersect one another, thereby forming a loop, are bonded by heating the wires with an oxyhydrogen flame, so that a gold solder which establishes the bond is heated to the melting point. In a such method, there is the danger that the relatively thin wires will be undesirably overheated. Furthermore it is difficult to deliver small quantities of gold solder to the work, and the method is difficult to automate.

OBJECT AND SUMMARY OF THE INVENTION

The method according to the invention for bonding electrically conductive wires has the advantage over the prior art that the soldering temperature can be regulated or established satisfactorily by way of the electrical voltage, and the heating action is concentrated on the soldering location, thereby preventing overheating of the wires themselves. Furthermore, since the soldering material is applied in the form of a layer on the wires, the separate delivery of soldering material to the work becomes unnecessary.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
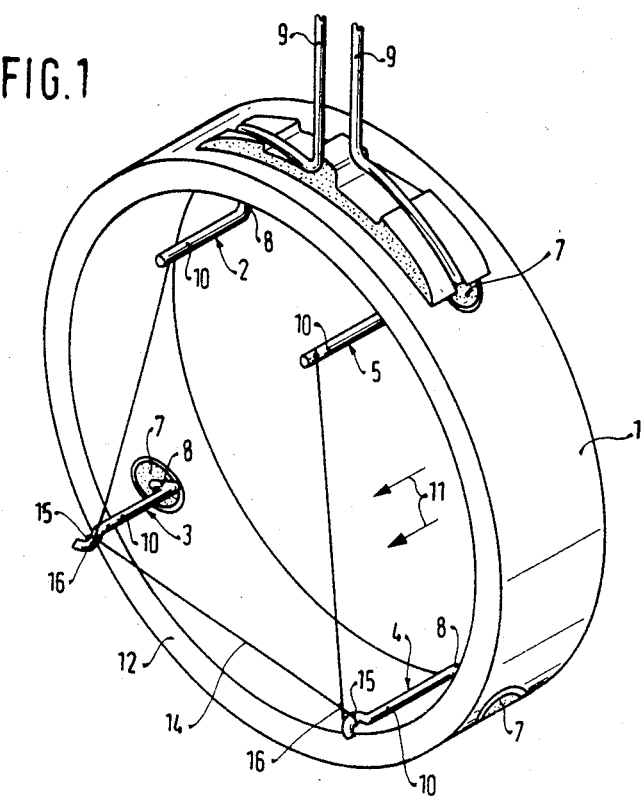
FIG. 1 shows a carrier body having a hot wire fastened to it for measuring the flow rate of a flowing medium.

FIG. 1 shows an annular carrier body 1, which naturally may also take any other desired shape, having four wire holders 2, 3, 4 and 5. The wire holders are electrically conductive material, for instance platinum wire having a thickness of 0.4 mm or a platinum-plated wire having a core of an iron-nickel alloy and a platinum coating. The wire holders are fastened in the carrier body 1 via glass seals 7 for the purpose of thermal and electrical insulation. The wire holders 2, 3, 4 and 5 have a radial segment 8 pointing in the radial direction into the interior of the holder body 1, at which radial segment 8, fastening is effected by means of the glass seal 7. The wire holders 2 and 5 furthermore have terminal segments 9 adjoining the radial segments 8 which through the glass seal 7 and 9 leads to a known electronic control unit, not shown. In the interior of the carrier body 1, the radial segments 8 of each wire holders 2, 3, 4 and 5 are followed by angular segments 10, which are bent at an angle of approximately 90° from the radial segments 8 and extend approximately parallel to the flow direction of a quantity of medium flowing through the carrier body 1. The angular segments 10 of the holder wires 2, 3, 4 and 5 may protrude beyond an end face 12 of the carrier body 1. A so-called hot wire 14 is fastened to these angular segments 10 of the holder wires 2, 3, 4 and 5 they protrude beyond the end face 12 in such a manner that the hot wire 14 extends from the holder wire 2 to the wire holder 3 and from there via the wire holder 4 to the wire holder 5; the hot wire 14 is soldered to the angular segments 10 of the wire holders 2 and 5, while it is only loosely guided, in the form of a loop 15, over the ends of angular segments 10 of the wire holders 3 and 4. The intersecting wire segments of the loop 15 are electrically connected with one another at the respective intersection point 16. As a result, the loop 15 becomes free of electrical current and is not heated by current flow. The hot wire 14 can likewise be fabricated of platinum wire and has a thickness of approximately 0.07 mm. The use of a temperature-dependent resistor in the form of a hot wire for measuring the mass of a flowing medium is already known, for instance to detect the flow rate of air aspirated by an internal combustion engine, to which end the carrier body 1 with the hot wire 14 fastened to it is disposed in the air intake tube of an internal combustion engine. By way of the terminal segments 9, the hot wire 14 is thereby supplied with current from an electronic control unit, not shown, and the supply of current is regulated in such a manner that the hot wire 14 heats up to a predetermined temperature which is above the average air temperature of the aspirated air mass. If the flow speed or in other words the quantity of air aspirated per unit of time increases, then the hot wire 14 cools down to an increased extent. This cooling is fed back to the electronic control unit, which in response directs a higher current to the hot wire 14 until the set temperature value at the hot wire 14 has been reestablished. This correcting variable of the electronic control unit simultaneously represents a standard for the aspirated air mass, which can be delivered as a measurement variable to a metering circuit of the engine in order to adapt the required fuel quantity to the quantity of air aspirated per unit of time.

Figure 2:
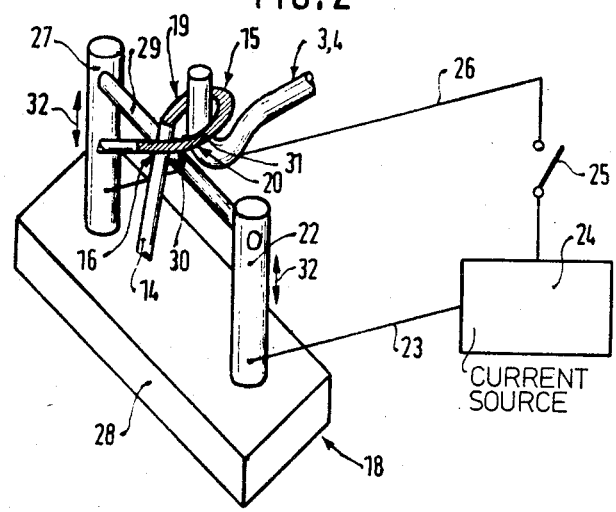
FIG. 2 shows an apparatus for performing the method according to the invention, for example for bonding a hot wire having intersecting wire segments and fastened to a carrier body as shown in FIG. 1.

FIG. 2 is a schematic illustration of an apparatus with which the bonding of the wire segments 19, 20 of the hot wire 14 forming the loop 15 can be accomplished at the intersection point 16 in accordance with the invention. One wire segment 19 extends on one side of the holder wire 3, 4 and the other wire segment 20 extends on the other side of the holder wire 3, 4, each segment 19, 20 extending from the holder wire 3, 4 to the intersection point 16. A soldering tool 18 is provided, which has an electrically conductive first pole 22 which is connected via an electrical connecting line 23 with a current source 24. A timing element, such as an RC element, is contained in the current source 24. On the other side, an electrical connecting wire 26 leads from the current source 24 via a switch 25 to a second pole 27. The poles 22, 27 are supported with respect to one another in an insulating holder 28, and are also connected with one another by means of an electrode 29, for instance of platinum wire having a thickness of 0.5 mm.

The hot wire is partially provided, in a soldering segment 30, with a layer 31 of soldering material shown shaded in the drawing. In wires of platinum, pure gold is preferably used as the soldering material. The soldering material layer 31 can be applied by electroplating to the hot wire in the form of a layer approximately 0.003 to 0.005 mm thick disposed only at specified intervals, so that the soldering material occurs only on one portion of a wire segment portion of the two wire segments at the intersection point 16 for the two wire segments 19, 20.

To perform the method according to the invention, in a first operation, the hot wire 14 which is to be bonded is now guided around the respective holder wires 3, 4, forming a loop 15, in such a manner that the soldering segment 30 of the hot wire 14 which is provided with the soldering material layer 31 comes to rest in the vicinity of the intersection point 16 of the wire segments 19, 20 forming the loop 15, and in fact only one of the wire segments 19, 20 as shown; in the drawing in FIG. 2 is coated with the layer of solder where the soldering segment 30 comes to rest on the non-soldered segment. In a second operation, the electrode 29 of the soldering tool 18 is now moved in the direction of the arrow 32 such that it is brought into contact at the intersection point 16 with the intersecting wire segment 19 not provided with the soldering material layer 31, bringing this wire segment 19 into contact with the wire segment 20. In a third operation, the closing of the current circuit 23, 24, 26 by means of the switch 25 causes the electrode 29 to heat up, by the principle of resistance heating, to a teperature which is sufficient to cause the soldering material layer 31 to melt (with pure gold, this is approximately 1,060° C.), so that the soldering material furnishes a bond between the wire segments 19, 20 of the hot wire 14 at the intersection point 16 which is resistant not only to corrosive forces but also to temperatures of approximately 900° C. Because the soldering material layer 31 extends only on one of the two wire segments 19, 20 into the vicinity of the intersection point 16, soldering material is prevented from coming into contact with the electrode 29 and causing an undesirable soldering. The precise adjustment of the required electrical voltage at the current source 24 and a time limitation on the heating process by means of a timing element assure a soldered bond without the danger of overheating the wires to be bonded. The method according to the invention has the further advantage that it is amenable to automation.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for bonding electrically conductive wires, for forming a loop of intersecting first and second wire segments of a hot wire fastened on a carrier body via holder wires connected with the carrier body, by heating of a solder material, which comprises applying a layer of solder material on said second wire segment so that said solder material layer is disposed on said wire segment only at specified intervals, guiding the wire to be bonded around a wire holder thereby forming a loop including said first and second wire segments, positioning said second wire segment of said loop with said layer of solder material thereon above and in contact with said first wire segment in a vicinity of an intersection point of said first and second wire segments thereby forming said loop, positioning an electrode of a soldering tool located between poles of an electrical current circuit into contact with said first wire segment at the intersection point of said first and second wire segments with said first wire segment between said electrode and said layer of solder material on said second wire segment, applying an electrical current to said electrode of said soldering tool for the purpose of resistance heating of the electrode, until a melting temperature of the solder material on said second wire segment is attained and a secure soldered connection of the intersecting first and second wire segments at the intersection point is assured.

2. A method as defined by claim 1, characterized in that the wire loop to be bonded is of platinum and the layer of solder material applied to the soldering segment is of gold.

* * * * *